US008410992B2

(12) United States Patent
Bailey et al.

(10) Patent No.: US 8,410,992 B2
(45) Date of Patent: *Apr. 2, 2013

(54) FLUORESCENT DYE TO IMPROVE PRIMER COVERAGE ACCURACY FOR BONDING APPLICATIONS

(75) Inventors: Nancy N. Bailey, La Mesa, CA (US); Robert Michael Gaukel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/107,602

(22) Filed: May 13, 2011

(65) Prior Publication Data
US 2011/0215982 A1 Sep. 8, 2011

Related U.S. Application Data

(62) Division of application No. 11/779,226, filed on Jul. 17, 2007, now Pat. No. 8,038,815.

(51) Int. Cl.
*H01Q 1/42* (2006.01)
(52) U.S. Cl. .................. 343/872; 156/379.6
(58) Field of Classification Search ............ 156/379.6; 427/8; 343/872
See application file for complete search history.

(56) References Cited

U.S. PATENT DOCUMENTS

| 3,794,997 A | 2/1974 | Iwatsuki et al. |
| 5,550,555 A | 8/1996 | Cottrell |
| 5,684,664 A | 11/1997 | Julke et al. |
| 5,742,255 A | 4/1998 | Afendras |
| 5,818,393 A | 10/1998 | Fowler et al. |
| 5,977,710 A | 11/1999 | Kuramoto et al. |
| 6,339,397 B1 | 1/2002 | Baker |
| 6,496,138 B1 | 12/2002 | Honma |
| 7,027,004 B2 | 4/2006 | Haunberger et al. |
| 7,336,241 B2 * | 2/2008 | Bailey et al. ........... 343/872 |
| 2003/0232152 A1 * | 12/2003 | Allam et al. ........... 427/595 |
| 2004/0257298 A1 | 12/2004 | Larouche et al. |
| 2005/0035923 A1 | 2/2005 | Syed et al. |
| 2006/0033674 A1 | 2/2006 | Essig, Jr. et al. |
| 2007/0057862 A1 * | 3/2007 | Bailey et al. ........... 343/872 |
| 2009/0020210 A1 | 1/2009 | Bailey et al. |

FOREIGN PATENT DOCUMENTS
DE 3151012 7/1983
(Continued)

OTHER PUBLICATIONS

Deardorff, J.: "Fluorescent coatings and black light inspection" Materials Performance, NACE International, Houston, TX, US, vol. 47, No. 11, Nov. 1, 2008, pp. 48-50, XP001517056 ISSN: 0094-1492 the whole document.

(Continued)

*Primary Examiner* — Daniel McNally

(57) ABSTRACT

A method of visually verifying the application of a primer or adhesion promoter to a surface for optimizing the adhesion of a bonding tape to the surface. A fluorescing agent is mixed with the primer and a light source is emitted on the surface causing the agent to fluoresce when the primer is applied. The technician can then visually verify coverage of the primer. The fluorescing agent does not affect the bonding properties of the bonding tape or affect the aesthetic appearance of the surface or the material being bonded to the surface.

11 Claims, 3 Drawing Sheets

FOREIGN PATENT DOCUMENTS

| | | |
|---|---|---|
| DE | 19841187 | 2/2000 |
| EP | 0725496 | 8/1996 |
| EP | 0726581 | 8/1996 |
| EP | 0795925 | 9/1997 |
| JP | 02141007 | 5/1990 |
| JP | 07176925 | 7/1995 |
| KR | 20040107627 | 12/2004 |
| WO | WO9963617 | 12/1999 |
| WO | WO2004050391 | 6/2004 |
| WO | WO2009029327 | 3/2009 |

OTHER PUBLICATIONS

International Search Report and Written Opinion—PCT/US2008/067542, International Search Authority—European Patent Office—Jan. 7, 2009.

International Search Report and Written Opinion—PCT/US2008/070360, International Search Authority—European Patent Office—Aug. 24, 2009.

\* cited by examiner

FLUORESCENT DYE TO IMPROVE PRIMER COVERAGE ACCURACY FOR BONDING APPLICATIONS

BACKGROUND

1. Field

The present invention relates generally to bonding systems, and more specifically to an apparatus and method for using a fluorescent dye to provide a visual verification of primer coverage for a bonding operation without affecting the bond integrity or cosmetic appearance of the final product.

2. Background

Typically, mobile tracking and messaging antennas for mobile tracking and messaging systems, such as that used with Qualcomm Incorporated's OmniTRACS® system, are housed within a radome. A radome is an enclosed housing, usually made of a low-loss dielectric material that serves to protect antennas mounted on ground-based vehicles, ships, airplanes and the like without significantly altering the electrical performance of the enclosed antennas. A radome is typically a translucent dome-shaped member, affixed to the vehicle and is highly visible.

Transit buses and heavy industrial equipment having tracking and messaging systems are well suited for use with radomes. The dielectric material of the radome is usually made of a plastic material having a thickness on the order of the wavelength associated with an antenna used therewith.

Mobile tracking of equipment, such as industrial vehicles, can involve the Global Positioning System (GPS), which can be used to track vehicles using a number of low earth orbiting satellites.

FIG. 1 illustrates a three-dimensional perspective view of a prior art messaging and tracking antenna setup, including an antenna assembly, referenced herein as antenna communications unit (ACU) 2. ACU 2 in conjunction with circuitry, not shown, is a mobile transceiver. ACU 2, when installed in vehicles, such as trucks, allows two-way communication between drivers and logistic centers. GPS patch antenna 4, mounted to ground plane 5, provides reception of GPS signals which, for instance, allow truck systems controllers to know the location of a truck and its cargo. Patch antenna 4 and ground plane 5 are disposed on cast aluminum base 6 covered by radome 8. Base 6 of ACU 2 can be mounted to a vehicle (e.g., tractor cab). Radome 8 can be attached to base 6 preferably a using a v-clamp. Rotating messaging antenna 10 which is well-suited for digital communications involving geostationary satellites, particularly involving code division multiple access (CDMA), is rotatable on pedestal 11 about axis 12 through radome 8 in a plane between peak 14 of radome 8 and base 6. A system of this type can, for example, use an uplink (transmit) frequency band of 14.0-14.5 GHz while the downlink (receive) frequencies range from 11.7-12.2 GHz. In an effort to improve satellite communications, antenna 10 rotates toward a satellite in connection with communication therewith.

While the messaging antenna is capable of movement to increase transmission and reception signal strength, the GPS antenna is stationary. In order to optimize GPS performance, it is desirable to locate the GPS antenna in clear line of sight to the GPS satellite constellation. Thus, a method and apparatus to effectively mount the GPS antenna to the radome is needed. Further a method and apparatus to optimize the mounting of the GPS antenna is also needed.

SUMMARY

Embodiments disclosed herein address the above stated needs by providing a system for effectively applying a primer with a visual component to ensure primer coverage without affecting the bonding integrity or cosmetic properties of the radome. In one embodiment, the Qualcomm transceiver uses VHB™ (very high bond tape) to secure a GPS (global positioning system) antenna to the inside surface of a plastic enclosure, such as a radome. During assembly of the radome mounted GPS an adhesion promoter or primer is manually applied to the radome. It is difficult to determine by visual inspection where the colorless primer has been applied. Primer coverage is critical because the performance of the VHB™ will be compromised if the surfaces to be bonded are not properly pre-conditioned before the VHB™ is installed. An inspection method was needed which would allow assemblers and those performing post-assembly audits to readily determine if primer had been applied properly. Adding colorant to the adhesion promoter was a cosmetically unacceptable option because tinted primer would be visible through the translucent radome. Further, it is necessary that any additive to the primer will not adversely affect the bond integrity of the tape holding the GPS receiver to the radome.

When ultraviolet (UV) sensitive dye is mixed into the primer the solution still appears clear under ambient light, but fluoresces in the presence of a UV emitting light source. Environmental test results show that the addition of UV dye to the primer does not affect the performance of the VHB™ tape. Thus, by adding a fluorescing dye to the primer solution and using a light to cause the dye to fluoresce will visually show the coverage of the primer and not affect the bonding properties of the applied bonding tape nor affect the aesthetic appearance of the final radome product.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
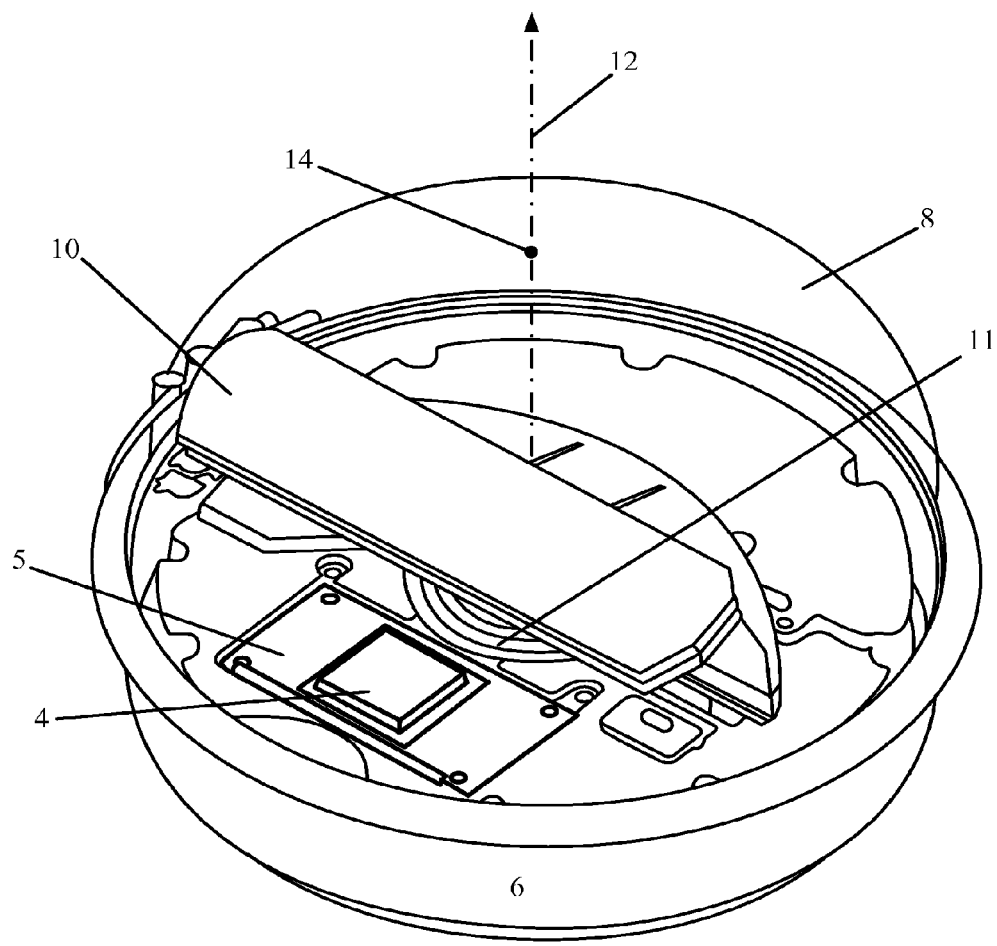
FIG. 1 illustrates a three-dimensional perspective view of a prior art messaging and tracking antenna setup.
Figure 2:
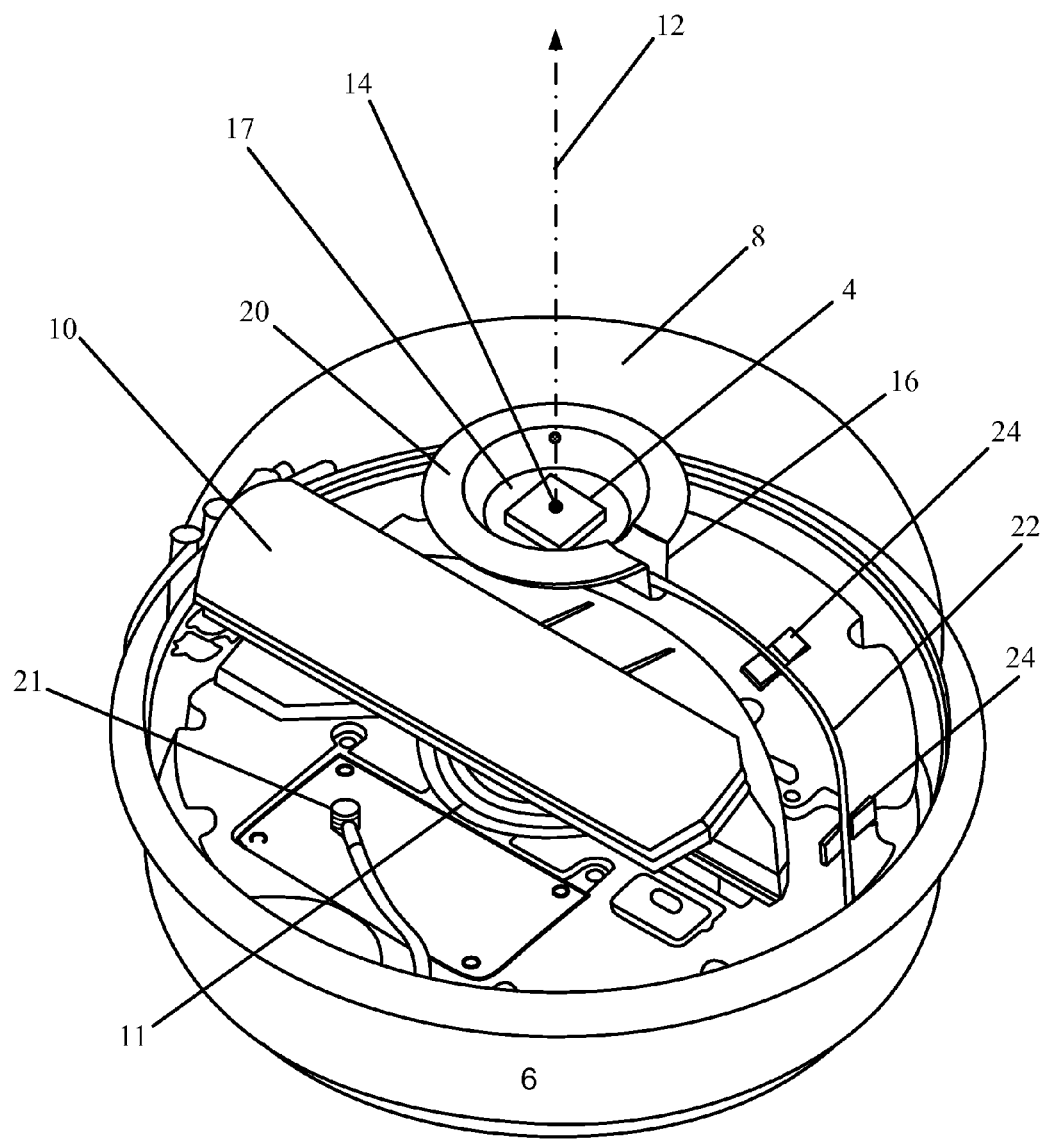
FIG. 2 shows the preferred patch antenna attached to a radome.

FIG. 2 shows the preferred patch antenna attached to a radome. GPS patch antenna 4 lies within thermoformed antenna cup 16 which is adhered to radome 8 by adhesive ring 20. Circular shaped ground plane 17 is adhered to cup 16 by a second adhesive ring (not shown). A soldered connection 14 of predetermined length joins ground plane 17 to patch antenna 4. The length of connection 14 has bearing on the gain associated with antenna 4. GPS coaxial antenna cable 22 is connected to ground plane 17 and is adhered to and along a wall of radome 8 enclosing, among other things, patch antenna 4 and rotating messaging antenna 10. Cable 22 is connected at another end to circuitry 21 within the transceiver formed by ACU 2. In one aspect, radome 8 is preferably constructed from a thin polycarbonate. However, the thin-walled thermoformed radome is not conducive toward allowing radome attachment of cup 16 and cable 22 by way of rivet, other conventional threaded fasteners (e.g., screws) or other commonly available measures since the thermoplastic can easily crack in connection with such measures, thus creating a moisture ingress path from the region of penetration. This is particularly deleterious to ACU 2 since base 6 and radome 8, in one aspect, are sealed to help isolate ACU 2 from the surrounding environment. In experimental tests, ultrasonic weld and solvent bond methods of adhesion of cup 16 to radome 8 proved unacceptable, causing radome 8 to become embrittled. Adhesion of cup 16 and cable 22 using bond tape, such as 3M® VHB™ 5952 pressure sensitive adhesive tape obviated any need for screws, rivets, and silicones.

One challenge in implementing the attachment of cable 22 and cup 16, containing patch antenna 4, to radome 8 lie in identifying a robust mount that would be able to withstand years of fatigue in an outdoor mobile application while potentially being exposed to the Earth's most extreme climates. ACU 2 is frequently deployed in harsh, inhospitable regions of the world and as such, it must operate reliably when exposed to diverse climatic conditions offered by high humidity scenarios encountered in the Amazon River basin, extreme heat typical of desserts in the American southwest and rugged terrain and winter temperatures reaching −40° C. in northern Alaska. The method of attachment would be subjected to rapid excursions in temperature, extended exposure to hot and cold extremes, and high impact stress at severe cold temperatures. Preferably, the bonding agent used for adherence would have low water absorption properties and demonstrate a high degree of radio frequency (RF) transparency over a range of frequencies.

After much experimental testing, adhesion to radome 8 was obtained using a double-sided adhesive tape. It was determined that commercially available 3M® VHB™ 5952 tape was best suited to adhere cup 16, containing patch antenna 4, and GPS antenna cable 22 to radome 8. 3M® VHB™ 5952 is a very high bond, double-sided acrylic foam tape. As illustrated in FIG. 2, two strips of tape 24 are preferably applied to adhere cable 22 to the enclosing wall of radome 8. As shown, cable 22 is captured under a strap fastened to radome 8 with two ends of tape 24. Tape 24 is deformable so as to securely affix cable 22 to the surface of radome 8 through the foam surface. Adhesive ring 20 is a double-sided adhesive used to secure cup 16 on one side and radome 8 on the other, made from 3M® VHB™ 5952 tape in a preferred embodiment. A smaller adhesive ring (not shown) is likewise a double-sided adhesive ring made from 3M® VHB™ 5952 tape which secures ground plane 17 to cup 16.

In order to optimized the adhesion of bond tape 24 and adhesive ring 20, an adhesion promoter or primer is applied to the surfaces to be taped prior to the application of bond tape 24 and adhesive ring 20. The preferred primer is 2252AT primer from 3M®; however a similar product can be used. The primer is typically a clear liquid substance. This creates problems associated with applying the primer. When applying the primer, a technician cannot determine visually whether the primer adequately covers the area to be covered by bond tape 24 and adhesive ring 20. Sporadic or inadequate application of the primer dramatically affects the adhesion properties of bond tape 24 and adhesive ring 20 to the surface to be secured. In order to assure adequate coverage of the primer, a visually perceived agent can be applied to the primer. However, this agent must not affect the boding properties of bonding tape and also not adversely affect the aesthetic appearance of the finished product. In one embodiment, Ciba® UVITEX-OB fluorescent whitening agent is mixed into 3M® liquid acrylic adhesion promoter 2252AT primer. When an ultraviolet (UV) emitting light source is used at the assembly station the operator can readily verify during or after application of the VHB™ that primer has been administered to all critical areas of the radome. Once the primer is applied and visually verified, the primer is allowed to dry or blow-dried prior to application of the bonding tape 24 and adhesive ring 20 to radome 8.

Tests were conducted to prove that the addition of a fluorescent dye to the primer achieves better quality bonds and to determine whether the addition of the fluorescing agent effects the boding properties in high heat or cold impact conditions. A first test was performed on two populations—one population assembled with regular primer (no fluorescing agent added) and a second population assembled with fluorescing agent added to the primer. A second test was performed on three populations—one population assembled with regular primer (no fluorescing agent added), a second population assembled with fluorescing agent in the primer and a third population assembled with no primer.

Test #1

Purpose of test: To determine if the addition of fluorescent dye in the primer affects VHB adhesion when ACUs are exposed to an elevated temperature/humidity environment.

Description of test: Ciba® UVITEX-OB, a fluorescent whitening agent was manually mixed per manufacturers recommendations at a concentration of 2% into 3M acrylic adhesion promoter 2262AT primer (0.2 g mixed into a 4 oz bottle of primer). UVITEX-OB is stable, has low toxicity, and is not classified as a hazardous substance under OSHA regulations. UV dye does not affect primer shelf life.

Five radomes were assembled with regular primer and five were assembled with dyed primer. Radomes were assembled onto advanced communication unit (ACU) housings with new lubricated o-rings, new v-bands and new nuts. Nuts were torque tightened to 24 inlbf. Input/output (I/O) connectors were sealed with room temperature vulcanization (RTV) silicone. During temp/humidity exposure global positioning system (GPS) cables were plugged into modules.

Description of Condensing Temp/Humidity Test: −40 C to +70 C, 90% RH for 2 hr each cycle while chamber temp is at 38 C or higher, 8 hr per cycle, 42 cycles total. ACUs were positioned in the chamber to allow maximum air flow.

Figure 3:
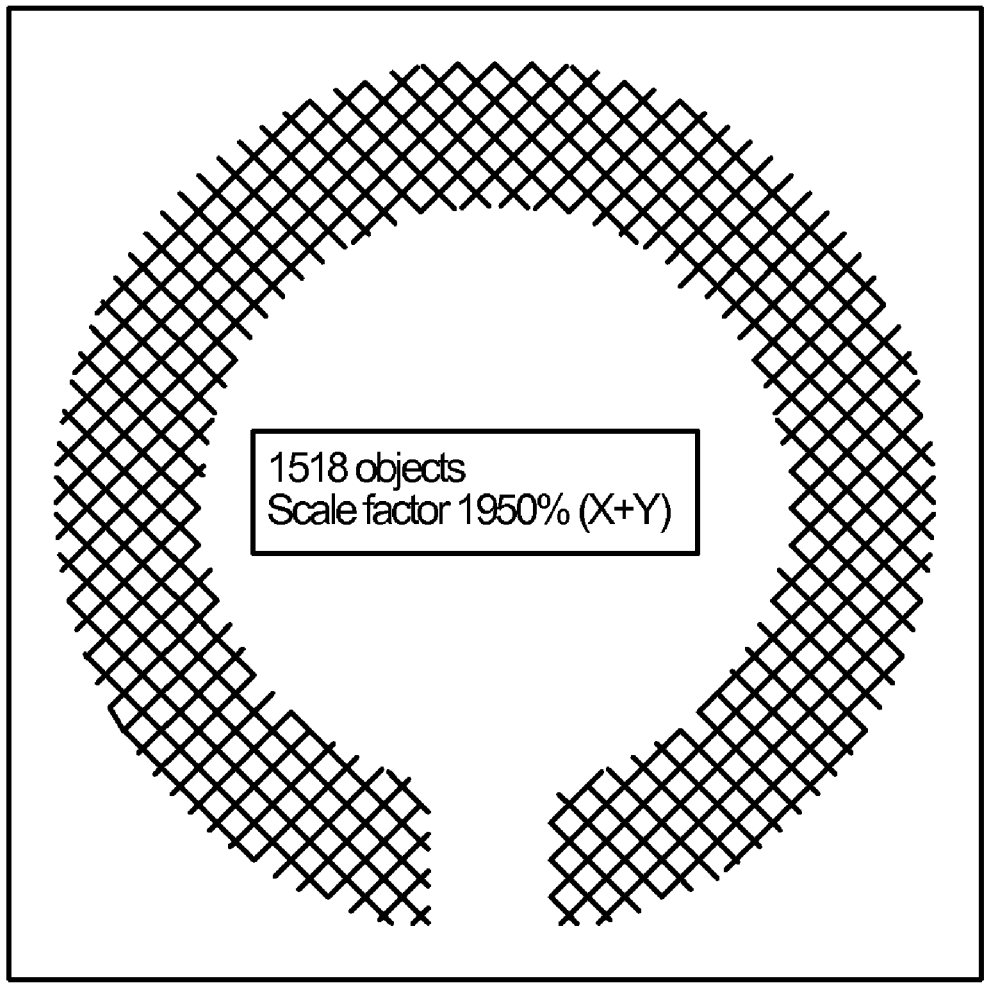
FIG. 3 shows the unmodified test grid used for overlying the modified or resulting grid.

Technique used to Evaluate Post Exposure Percent Adhesion Loss: After temp/humidity exposure digital images were taken of the VHB rings that bond cups to radomes. The camera was affixed to a stand set at a constant height to assure the same magnification of each image. These images were imported into CorelDRAW where they were overlaid with a fine grid pattern (grid size=0.0575 in×0.0575 in) of the same shape as the VHB ring (scale factor=1950%), as shown in FIG. 3. The grid was carefully positioned until its magnification and rotational position matched that of the photograph. Areas of adhesion loss appear lighter in the photographs than regions where the VHB is still well adhered to the radome. Using the mouse, grid squares located over areas of adhesion loss in the photo were manually deleted from the grid.

To determine percent adhesion loss, the number of remaining squares in the grid (representing areas of good adhesion) were counted and compared to 1518 which is the total number of squares in the original unmodified grid. FIG. 3 shows the unmodified grid and the results of each test unit were overlaid over the modified grid.

Results: There was insignificant difference in adhesion loss after temp/humidity exposure when comparing the group of radomes assembled with regular primer to the group assembled with fluorescent dye in the primer. Average adhesion loss of radomes with dyed primer=20.24%. Average adhesion loss of radomes with regular primer=20.46%.

Conclusion: The addition of fluorescent dye in the primer does not affect VHB adhesion when ACUs are exposed to an elevated temperature/humidity environment.

Test #2

Purpose of Test: To determine if the addition of fluorescent dye in the primer affects the cold impact resistance of the VHB used to hold the GPS cup inside the radome.

Description of test: Ciba® UVITEX-OB, a fluorescent whitening agent was manually mixed per manufacturers recommendations at a concentration of 0.2% into 3M acrylic adhesion promoter 2262AT primer (0.2 g mixed into a 4 oz bottle of primer). Radomes were marked on the outside by quadrant then primer was applied on the cups and radomes in the percent coverage's indicated in Table 1.

TABLE 1

Primer Application by Group Number

| Group-ID | R [reg primer] | D [dye in primer] | Coverage |
|---|---|---|---|
| G1-1 | No primer | No primer | No primer |
| G1-2 | No primer | No primer | No Primer |
| G1-3 | No primer | No Primer | No Primer |
| G2-1 | R | | 25% |
| G2-2 | R | | 25% |
| G2-3 | R | | 25% |
| G3-1 | R | | 50% |
| G3-2 | R | | 50% |
| G3-3 | R | | 50% |
| G4-1 | R | | 75% |
| G4-2 | R | | 75% |
| G4-3 | R | | 75% |
| G5-1 | R | | 100% |
| G5-2 | R | | 100% |
| G503 | R | | 100% |
| D2-1 | | D | 25% |
| D2-2 | | D | 25% |
| D2-3 | | D | 25% |
| D3-1 | | D | 50% |
| D3-2 | | D | 50% |
| D3-3 | | D | 50% |
| D4-1 | | D | 75% |
| D4-2 | | D | 75% |
| D4-3 | | D | 75% |
| D5-1 | | D | 100% |
| D5-2 | | D | 100% |
| D5-3 | | D | 100% |

Description of Impact Fixture: Impact tests were performed using an impact fixture. The fixture is designed to drop a cylindrical load weighing a maximum of 262 oz (16.4 lb) from a height of up to 48 in. A stack of weights (1.35 in diameter) with a spherical impact surface is held vertically inside a tube centered above the radome. The mass of the load (steel) can be adjusted by adding to or removing sections from the stack. Drop height is adjusted by changing the vertical position of a pin inserted below the load stack. When the operator is ready to let the load fall, he releases the stack by pulling out a pin. Impacts were administered 30 sec after the UUT was removed from the chamber. Drops were performed from a height of 30" unless otherwise noted. After each drop the stack was allowed to make multiple bounces off the radome before coming to rest.

The VHB bond line at the cup was inspected after each impact. If failure did not occur the ACU was returned to the chamber where it soaked for at least 30 min. before it was impacted again. Subsequent impacts were performed with incrementally heavier drop loads. If maximum load conditions (262 oz) did not result in debond failure, the test was continued at incrementally higher drop heights (up to 48 in).

Pass/Fail criteria: The test was considered a failure if more than 50% of the VHB debonded after impact. Generally 50% or greater debond results in a tilted condition of the PGS patch.

Results: There was negligible difference in cold impact resistance between regular primer and dyed primer when primer was applied over 50% of the bond line.

When primer was applied over 75% of the bond line the VHB assembled with dyed primer had greater cold impact resistance that the VHB assembled with regular primer.

Equivalent cold impact resistance was observed when dyed or regular primer was applied over 100% of the bond line.

Conclusions: The addition of fluorescent dye in the primer does not affect VHB cold impact resistance.

TABLE 2

Summary of Results

| Primer Coverage and Primer Type | Impact Load [oz] | Drop Height [in] | Comments |
|---|---|---|---|
| No primer | 60-65 | 30 | |
| 25% reg | 50-60 | 30 | Didn't test 25% dyed |
| 25% dyed | NA | NA | Didn't test 25% dyed |
| 50% reg | 70-95 | 30 | Insignificant difference in performance between regular and dyed primer |
| 50% dyed | 65-95 | 30 | Insignificant difference in performance between regular and dyed primer |
| 75% reg | 80-85 | 30 | Dyed primer outperformed regular primer with ⅔ dyed radomes surviving the max impact allowed by fixture |
| 75% dyed | 115-262 | 30 | Dyed primer outperformed regular primer with ⅔ dyed radomes surviving the max impact allowed by fixture |
| 100% reg | 262 | 48 | Dyed and regular primer radomes all survived max impact allowed by fixture |
| 100% dyed | 262 | 48 | Dyed and regular primer radomes all survived max impact allowed by fixture |

The addition of fluorescent dye to the primer provides an easy and reliable inspection technique for assemblers or those performing audits of the assembled product to verify that adhesion promoter has been applied under the VHB™. Complete primer coverage is critical to assure optimal bond integrity of the VHB™ which holds the GPS receiver to the radome.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A system, comprising:
   a radome having a mixture of a fluorescing agent and a primer applied to one or more portions of an inner surface of the radome;
   a cup; and
   a double-sided bond tape, wherein a first side of the bond tape is applied to the cup and a second side of the bond tape is applied to the one or more portions of the inner surface of the radome to which the mixture is applied.

2. The system of claim 1 wherein the cup comprises a global positioning system antenna seated therein.

3. The system of claim 2, further comprising a global positioning system antenna cable adhered to the radome by double-sided bond tape.

4. The system of claim 2, further comprising a global positioning system antenna cable captured under a strap fastened to the radome by double-sided bond tape.

5. The system of claim 1 further comprising an ultraviolet emitting light source adapted to cause the fluorescing agent to fluoresce.

6. The system of claim 1, wherein the fluorescing agent permits verification of adequate coverage by the primer of the one or more portions of an inner surface of the radome to which the mixture of fluorescing agent and primer are applied.

7. The system of claim 1, wherein the radome comprises a polycarbonate material.

8. The system of claim 1, wherein the bond tape comprises acrylic foam.

9. The system of claim 1, wherein the primer comprises liquid acrylic.

10. The system of claim 1, wherein the fluorescing agent comprises fluorescent whitening agent.

11. The system of claim 1, wherein the mixture of primer and fluorescing agent comprises about 0.2% fluorescing agent.

* * * * *